E. MULLERN.
ENGINE PISTON.
APPLICATION FILED APR. 30, 1920.
1,428,552.
Patented Sept. 12, 1922.
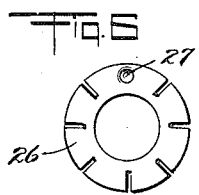
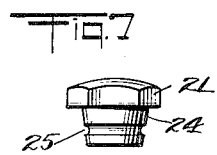
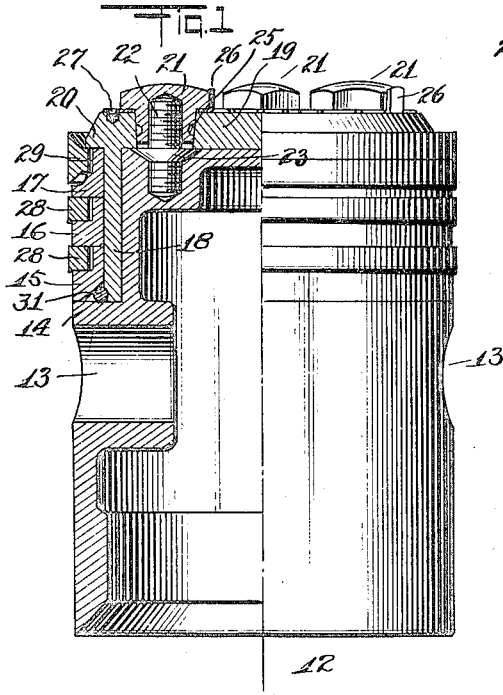
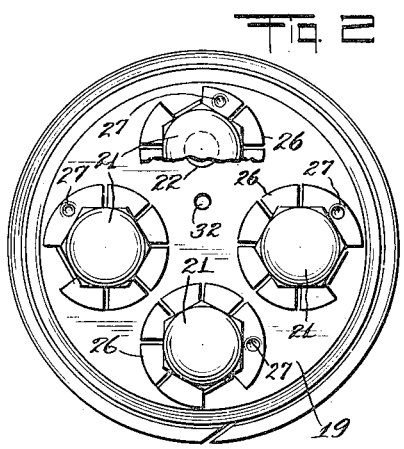
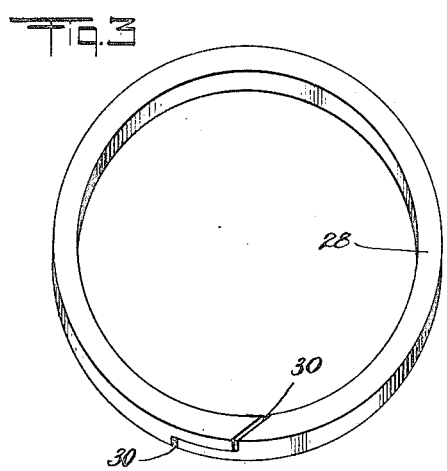
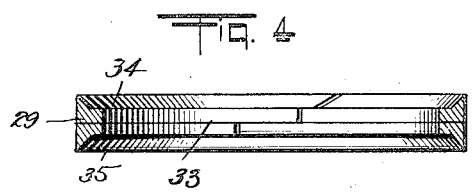
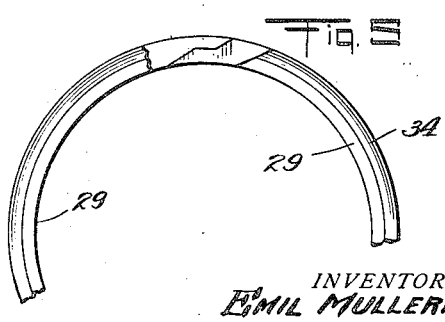
WITNESS
M. E. Lessin
INVENTOR
EMIL MULLERN
BY
ATTORNEY Patented Sept. 12, 1922.

1,428,552

UNITED STATES PATENT OFFICE.

EMIL MULLERN, OF NORTH ARLINGTON, NEW JERSEY.

ENGINE PISTON.

Application filed April 30, 1920. Serial No. 377,738.

*To all whom it may concern:*

Be it known that I, EMIL MULLERN, a citizen of Hungary, and a resident of North Arlington, in the county of Hudson and State of New Jersey, have invented certain new and useful Improvements in Engine Pistons, of which the following is a full, clear, and exact description.

Among the principal objects which the present invention has in view are: To avoid distortion of piston rings when disposing the same for service; to simplify the operation of cleaning and repairing piston heads; to avoid loss of compression; to prevent the upward passage of oil to lubricate the cylinder; and to prevent disarrangement or vibration of piston parts.

*Drawings.*

Figure 1 is a side elevation, partly in section, of a piston constructed and arranged in accordance with the present invention;

Figure 2 is a top view of the piston;

Figure 3 is a perspective view showing one of the packing rings with which the piston is provided;

Figure 4 is a cross section of the top wiping expansion ring;

Figure 5 is a detail view showing fragments of the same, and a portion of the lapped joint formed therein;

Figure 6 is a detail view showing in plan a local washer employed in constructing the herein disclosed piston; and Figure 7 is a side view of one of the nuts.

*Description.*

As seen in the drawings, pistons 12, when constructed in accordance with the present invention, have the usual apron provided with wrist pin bearings 13. Differing from the usual construction, however, the upper portion of the piston casting is reduced to form a bench 14, which extends around the piston to form a rest for the supporting rings 15, 16 and 17. The rings 15, 16 and 17 are solid and are machined to fit snugly the cylindrical wall 18 of the cap head 19. The head 19 has an overhanging flange 20, the upper wall of which is inwardly tapered. In service the flange 20 presses the rings 15, 16 and 17 firmly upon the bench 14.

The pressure thus applied to the rings 15, 16 and 17 is imparted by means of the cap nuts 21, which engage the stud bolts 22 in the reduced portion of the piston 12, as best seen in Figure 1 of the drawings. The stud bolts 22 are provided about midway of their length with annular flanges 23, which are tapered to fit rimmed sockets formed in the reduced portion of the piston. The outer edges of the flanges 23 are in service covered by the head 19. The greater diameter of the flanges 23 serves as detents or retainers for the bolts 22, when frictionally engaged by the sockets provided for the said flanges or by the overhanging portion of the heads.

As seen best in Figure 7 of the drawings, the barrel 24 of each of the nuts 21 is tapered, and is furnished with an annular groove 25, which is provided to form with the lubricant present a seal to prevent the passage of gases through the joint between the said barrel and the openings formed in the head 19 therefor. The nuts 21 may be locked in service in any approved manner. It is preferred to use the fembrated washer 26, shown best in Figure 6 of the drawings. Each washer has forced outward from the side thereof a detent 27, to receive which the head 19 is provided with a series of sockets. When the nuts 21 are set up tight, one or other of the sections of the washer 26 are upturned against one of the faucets of the nut, to thereafter hold the same against rotation, the detents 27 each operating to hold the washer 26 from rotation.

The rings 15, 16 and 17 are reduced to form benches for the reception of split expansion rings 28 and 29. The rings 28 are rectangular in cross section, and, as shown best in Figure 3 of the drawings, are split, the cross cuts 30 being disposed at an angle to the radii of the ring. These rings are constructed in the manner usually employed for constructing piston rings, except that the cross cuts are disposed so that if worn or too closely held within the cylinder, the lapped joints adapt themselves more readily to the discrepancy to thus avoid scoring the cylinder.

When placing the rings 28 in service, the rings 15 and 16 are removed from the wall 18, when the rings 28 are slipped over the reduced wall of the rings 15 and 16, without expanding or distending the said rings, in conformity with the usual practice. When the rings are stretched, as in accordance with the present practice, to pass over the piston to the grooves provided therein, the rings are drawn out of their natural seat and are given an added tension, which causes them to rub on the side walls of the cylinder unevenly, resulting in many instances in changing the shape of the cylinder. In accordance with the present invention, these rings are placed in service without changing the original seat, being slipped easily and without force over the reduced portions of the supporting rings 15 and 16.

To remove or replace the ring 29, the ring 17 is removed in the same manner as described with reference to the rings 15 and 16, and the ring 29 is removed from the reduced portion of the said ring 17, or replaced thereon without distortion of the said ring. When the supporting rings 15, 16 and 17, and their associated split rings 28 and 29 are disposed in service, as shown best in Figure 1, they are held on the wall 18 by a wire keeper 31. The keeper 31 is constructed of spring wire, to contract upon a groove formed adjacent the lower edge of the wall 18. When the keeper is in position, it is obvious that the various rings above enumerated cannot be removed from the wall 18. To give access to the keeper 31, the lower surface of the ring 15 is chamfered as best seen in Figure 1 of the drawings, so that when the head 19 with its accompanying rings, is lifted from the pistons 12, after the removal of the nuts 21, the groove in which the keeper 31 rests is exposed, so that by the insertion of any suitable tool the said keeper may be withdrawn from its groove and the various rings easily removed from the wall 18.

To lift the head 19 from the piston 12 after the nuts 21 have been removed, I provide tapped bottomed holes 32, one of which is shown in Figure 2 of the drawings. In service the washers 26 cover these holes, preventing the admission of carbon or other foreign substance thereto.

As shown best in Figure 4 of the drawings, the ring 29 has a rectangular body 33, and chamfered extensions 34 and 35. As seen in Figure 1 of the drawings, the chamfered extension 34 is exposed to pressure which may be applied to the head of the piston. In automobile engine service where a portion of the cycle is a compression stroke, the compression operating upon the inclined surface of the extension 34 expands the ring 29 outwardly against the wall of the engine cylinder. This effect is greatest at the moment when ignition occurs with the result that at the moment of greatest expansion pressure the open packing ring with which the piston is provided is forcefully expanded to close the joint between the piston and the cylinder wall. It is obvious that at the end of the power stroke when the exhaust port is opened, the reduced pressure results immediately in a diminution of the pressure of the ring 29 on the cylinder walls thus overcoming any tendency to drag on the cylinder during the operation of the piston between the compression strokes.

The extension 35 of the ring 29 is employed in the present invention for wiping the wall of the cylinder in the downward or power stroke thereof. The upper surface of the supporting ring 17 is cut away to form an annular recess under and facing the tapered surface of the extension 35. The recess thus formed constitutes a pocket into which the oil wiped from the surface of the cylinder by the extension 35 is placed, and thus prevented from being carried into the upper end of the cylinder to be there carbonized. It is obvious that on the return stroke of the piston the oil held within the annular recess of the ring 17 flows therefrom to be spread on the side wall of the cylinder to lubricate the piston in its movement. When cylinders are constructed as described the operation of the repairing or cleaning the same or the rings associated therewith is simplified, for the reason that the head 19 may be quickly and easily removed from the piston, without removing the piston from the cylinder. The head and its rings may then be taken to a bench, where the work is more readily and more perfectly performed. After the head and its rings are reassembled, the same may be returned to the pistons from which they have been removed with ease and without removing the pistons from their respective cylinders.

As seen best in Fig. 4 of the drawings, the ring 29 is preferably constructed of two half sections same being reversible. The half sections are preferably pinned together and may be arranged so that the lapped end sections shown in Fig. 5 may differ in form or be placed out of alignment.

Claims.

1. An engine piston comprising a body having a cylindrical reduced end; a solid supporting ring removably mounted on said end, said ring being recessed to form a groove for the reception of an expansible packing ring; a packing ring having a beveled extension exposed to the compression chamber of the cylinder with which said piston is associated for being expanded by the pressure formed in said chamber, said ring having a chambered extension at the opposite edge thereof for wiping the wall of the cylinder with which said piston is associated.

2. An engine piston comprising a body having a cylindrical reduced end; a solid supporting ring removably mounted on said end, said ring being recessed to form a groove for the reception of an expansible packing ring; a packing ring having a beveled extension exposed to the compression chamber of the cylinder with which said piston is associated for being expanded by the pressure formed in said chamber, said ring having a chamfered extension at the opposite edge thereof for wiping the wall of the cylinder with which said piston is associated; and means associated with said supporting ring for gathering the material wiped from the wall of said cylinder.

3. An engine piston comprising a body having a reduced cylindrical end forming a supporting bench; a cap head snugly fitting said end, and having an overhanging flange to form in conjunction with said bench an annular groove; a plurality of supporting rings removably fitted on said head under said flange; a keeper mounted on said head for holding said supporting rings in service relation to said head; a plurality of split packing rings each resting upon and associated with one of said supporting rings, said split rings being assembled on said supporting rings without distension of said split rings; and means for rigidly connecting said head with the reduced end of said piston, said means embodying a series of stud bolts permanently mounted in said end, and nuts engaging said bolts, said nuts extending into perforations formed in said head and overhanging the same to force said head toward said end.

4. An engine piston comprising a body having a reduced cylindrical end forming a supporting bench; a cap head snugly fitting said end, and having an overhanging flange to form in conjunction with said bench an annular groove; a plurality of supporting rings removably fitted on said head under said flange; a keeper mounted on said head for holding said supporting rings in service relation to said head; a plurality of split packing rings each resting upon and associated with one of said supporting rings, said split rings being assembled on said supporting rings without distension of said split rings; and means for rigidly connecting said head with the reduced end of said piston, said means embodying a series of stud bolts permanently mounted in said end, and nuts engaging said bolts, said nuts extending into perforations formed in said head and overhanging the same to force said head toward said end, said nuts having each an extension tapered in correspondence with perforations formed in said head.

EMIL MULLERN.